US012688417B2

(12) United States Patent　　　　(10) Patent No.:　US 12,688,417 B2
Friedenberg et al.　　　　　　　　　　(45) Date of Patent:　　Jul. 21, 2026

(54) ROBUST FRAMEWORK FOR INTELLIGENT NEURAL INTERFACE SYSTEMS

(71) Applicant: Battelle Memorial Institute, Columbus, OH (US)

(72) Inventors: David A. Friedenberg, Worthington, OH (US); Adam V. Rich, Columbus, OH (US); Michael R. Riedl, Worthington, OH (US); Jordan L. Vasko, Columbus, OH (US); Sanjay M. Tamrakar, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 906 days.

(21) Appl. No.: 18/048,531

(22) Filed: Oct. 21, 2022

(65) Prior Publication Data

US 2023/0127031 A1　　Apr. 27, 2023

Related U.S. Application Data

(60) Provisional application No. 63/270,120, filed on Oct. 21, 2021.

(51) Int. Cl.
G06N 3/08　　　　(2023.01)
G06F 3/01　　　　(2006.01)
G06N 3/04　　　　(2023.01)
(52) U.S. Cl.
CPC ............... G06N 3/08 (2013.01); G06F 3/015 (2013.01); G06N 3/04 (2013.01)
(58) Field of Classification Search
CPC　G06N 20/20; G06N 3/00; G06N 5/00; G06N 7/00; G06N 10/00; G06N 99/00; G06N 20/00; G06N 3/04; G06N 3/08; G06N 3/084; G06N 3/044; G06N 3/045; G06F 3/041; G06F 17/16; G06F 3/0354; G06F 3/0488; G06F 3/04883; G06F 30/27
See application file for complete search history.

(56) References Cited

U.S. PATENT DOCUMENTS

| | | | |
|---|---|---|---|
| 2018/0067605 A1* | 3/2018 | Lin ........................ | G06F 3/0416 |
| 2019/0314600 A1* | 10/2019 | Patel ................... | A61N 1/36025 |
| 2020/0302404 A1* | 9/2020 | Shaya .................... | G06Q 10/10 |
| 2021/0063972 A1 | 3/2021 | Sparks et al. | |

(Continued)

OTHER PUBLICATIONS

Ajiboye, et al., "Restoration of Reaching and Grasping Movements Through Brain-Controlled Muscle Stimulation in a Person with Tetraplegia: A Proof-of-Concept Demonstration", www.thelancet. com, vol. 389, May 6, 2017, pp. 1821-1830.

(Continued)

*Primary Examiner* — Rayeez R Chowdhury
(74) *Attorney, Agent, or Firm* — Secant IP, PLLC; Donald G. Weiss

(57)　　　　　ABSTRACT

In an approach to neural interface systems, a system includes feature extraction circuitry to identify one or more features of one or more input signals; and neural processing circuitry. The neural processing circuitry is configured to: identify a first context of a plurality of contexts based on a first trigger event; decode the one or more features of the one or more input signals to determine a first task of a plurality of tasks in the first context; and responsive to detecting a second trigger event, change the first context to a second context of the plurality of contexts.

16 Claims, 10 Drawing Sheets

(56) References Cited

U.S. PATENT DOCUMENTS

| | | |
|---|---|---|
| 2021/0219858 A1 | 7/2021 | Lee et al. |
| 2022/0104959 A1* | 4/2022 | Beavers .................. G06F 3/015 |

OTHER PUBLICATIONS

Bouton, et al., "Restoring Cortical Control of Functional Movement in a Human with Quadriplegia", Nature, Macmillan Publishers Limited, Apr. 2016, 14 pages.

Christie, et al., "Comparison of Spike Sorting and Thresholding of Voltage Waveforms for Intracortical Brain-Machine Interface Performance", J Neural Eng., Feb. 2015, p. 1-20.

Collinger, et al., "High-Performance Neuroprosthetic Control by an Individual with Tetraplegia", www.thelancet.com, vol. 381, Feb. 16, 2013, pp. 557-564.

Du, "Surface EMG-Based Inter-Session Gesture Recognition Enhanced by Deep Domain Adaptation", Sensors, 2017, 17, 458, pp. 1-22.

Dunlap, et al., "Classifying Intracortical Brain-Machine Interface Signal Disruptions Based on System Performance and Applicable Compensatory Strategies: A Review", Frontiers in Neurobotics, vol. 14, Article 558987, Oct. 2020, pp. 1-22.

Ganzer, et al., "Restoring the Sense of Touch Using a Sensorimotor Demultiplexing Neural Interface", Cell 181, Elsevier Inc., May 14, 2020, pp. 763-773.

Huggins, et al., "What Would Brain-Computer Interface Users Want: Opinions and Priorities of Potential Users with Spinal Cord Injury", Archives of Physical Medicine and Rehabilitation, 2015, 96, 3 Suppl 1, pp. S38-S45.

Ketykó, et al., "Domain Adaptation for sEMG-Based Gesture Recognition with Recurrent Neural Networks", International Joint Conference on Neural Networks, Budapest, Hungary, Jul. 2019, pp. 14-19.

Liu, et al., "DARTS: Differentiable Architecture Search", Published as a conference paper at ICLR 2019, pp. 1-13.

Vansteensel, et al., "Fully Implanted Brain-Computer Interface in a Locked-In Patient with ALS", The New England Journal of Medicine, 375; 21, Nov. 24, 2016, pp. 2060-2066.

Vasko, et al., "Increasing Robustness of Brain-Computer Interfaces through Automatic Detection and Removal of Corrupted Input Signals", Frontiers in Neuroscience, vol. 16, Article 858377, Apr. 28, 2022, pp. 1-17.

Weiss, et al., "Demonstration of a Portable Intracortical Brain-Computer Interface", Brain-Computer Interfaces, 2019, vol. 6, No. 4, pp. 106-117.

Skomrock, et al., "A Characterization of Brain-Computer Interface Performance Trade-Offs Using Support Vector Machines and Deep Neural Networks to Decode Movement Intent", Frontiers in Neuroscience, vol. 12, Article 763, Oct. 2018, pp. 1-14.

Schwemmer, et al., "Meeting brain-computer interface user performance expectations using a deep neural network decoding framework", Nature Medicine, vol. 24, Issue 11, 2018, pp. 1669-1676.

https://en.wikipedia.org/wiki/Discrete_wavelet_transform, accessed Nov. 22, 2022.

International Search Report and Written Opinion from corresponding PCT Appln. No. PCT/US22/78497, mail date Mar. 1, 2023. 11 pages.

Rondik, Tomas, "Methods for Detection of ERP Waveforms in BCI Systems", Technical Report No. DCSE/TR-2012-10, Aug. 2012, Retrieved on Feb. 9, 2023 from URL: https://otik.uk.zcu.cz/bitsteam/11025/21556/1/Rondik.pdf, 71 pages.

International Preliminary Report on Patentability from corresponding PCT Appln. No. PCT/US2022/078497, mail date May 2, 2024. 7 pages.

* cited by examiner

FIG. 1A

Context A: Enter Home

- Turn on lights
- Play Music
- Adjust thermostat
- Close garage door
- FES grips for changing clothes

Context B: Living area

- Watch TV
- Play video game
- Prepare food
- FES grips for eating
- Make phone calls
- Adjust lights

Context C: Bedroom

- FES grips for grooming
- FES grips for dressing
- Adjust thermostat
- Set alarm
- Turn off lights

120'

122'

900

START

IDENTIFY A CURRENT CONTEXT BASED
ON A CURRENT TRIGGER EVENT
902

DECODE FEATURES OF AN INPUT SIGNAL TO
DETERMINE A FIRST TASK
904

RESPONSIVE TO DETECTING A NEXT TRIGGER EVENT,
CHANGE THE CURRENT CONTEXT TO
A NEXT CONTEXT
906

END

ROBUST FRAMEWORK FOR INTELLIGENT NEURAL INTERFACE SYSTEMS

CROSS-REFERENCE TO RELATED APPLICATIONS

The present application claims the benefit of the filing date of U.S. Provisional Application Ser. No. 63/270,120, filed Oct. 21, 2021, the entire teachings of which application is hereby incorporated herein by reference.

STATEMENT REGARDING FEDERALLY SPONSORED RESEARCH OR DEVELOPMENT

This invention was made with government support under HR00111990043 awarded by the Defense Advanced Research Projects Agency. The government has certain rights in the invention.

TECHNICAL FIELD

The present application relates generally to neural interface systems.

BACKGROUND

Despite high expectations and significant investments, neural interfaces, including Brain-Computer Interfaces (BCIs) and electromyography (EMG) interfaces have yet to transition out of the laboratory setting and into practical usage. A major impediment to this transition is designing intelligent decoding algorithms—the algorithms that translate neural activity into actions—that meet the everyday needs of users. The current state-of-the-art in human decoding requires the user to engage in 15-45 minutes of algorithm calibration before the user can reliably operate the system each day. Furthermore, if the user wants to then perform actions that were not part of the initial algorithm calibration, they need to start over from scratch to calibrate a new decoder specific to the new actions. These requirements stem from the non-stationarity of the recorded signals, which require the decoder to be regularly updated, combined with the inflexible $1^{st}$ and $2^{nd}$ wave artificial intelligence (AI) methods that are commonly used to decode the signals.

BRIEF DESCRIPTION OF THE DRAWINGS

Reference should be made to the following detailed description which should be read in conjunction with the following figures, wherein like numerals represent like parts.

Figure 1A:
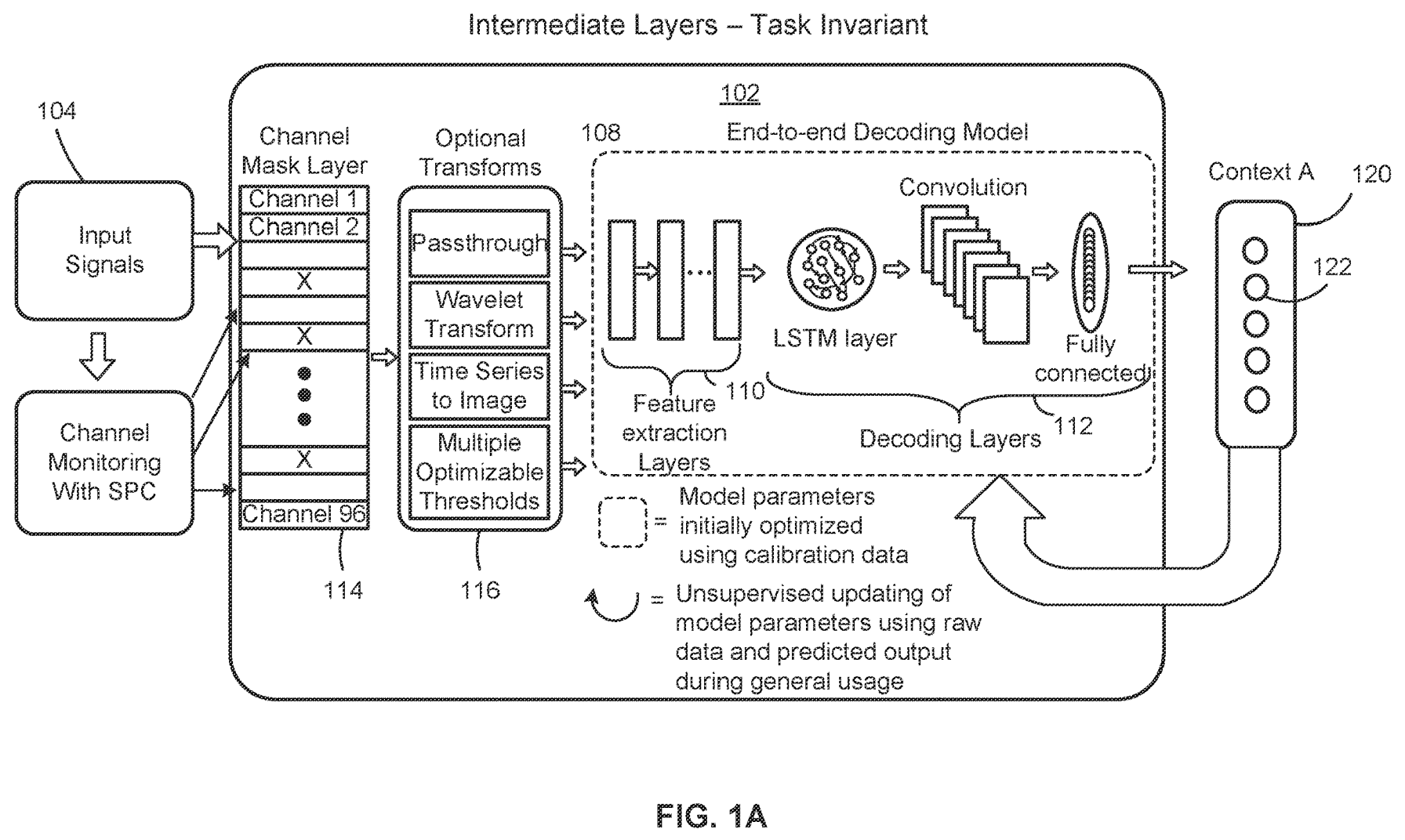

FIG. 1A illustrates a neural interface system according to several embodiments of the present disclosure.

DETAILED DESCRIPTION

Figure 1B:
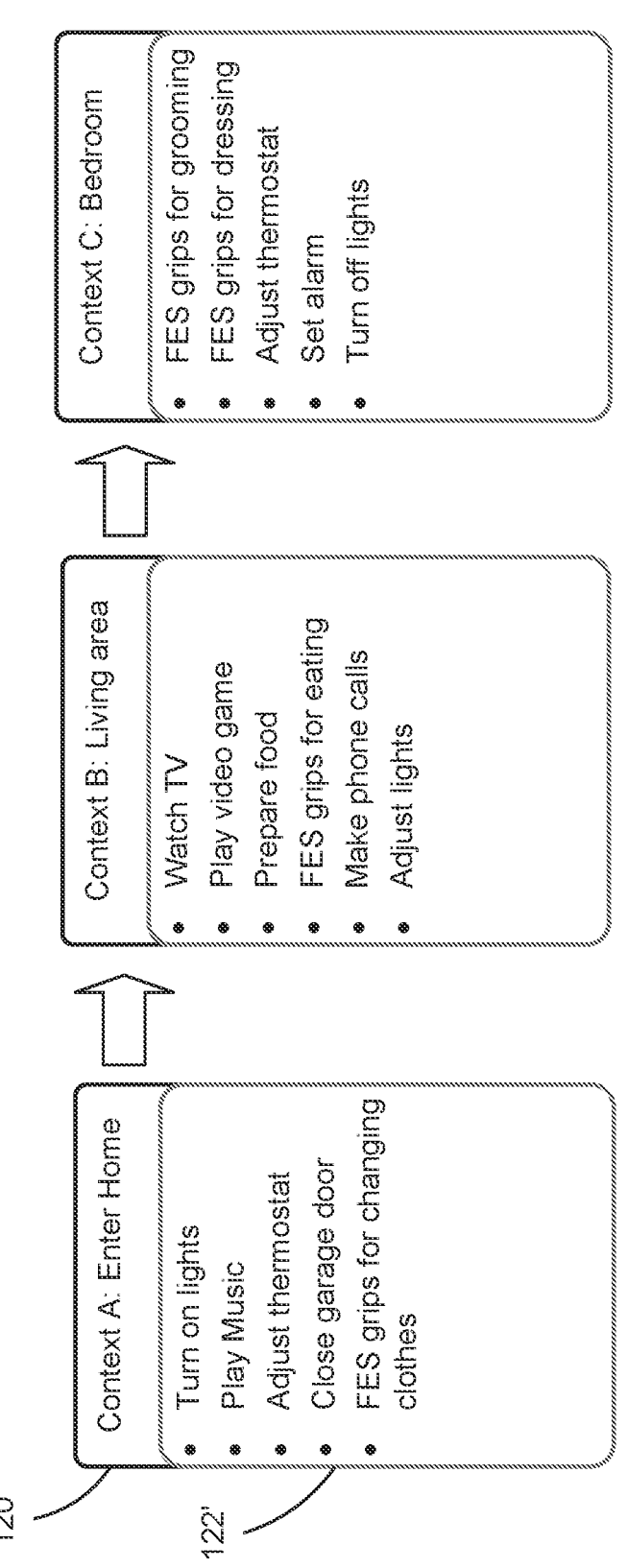
FIG. 1B illustrates some example contexts with associated tasks consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

This disclosure provides neural interface systems that include end-to-end neural network decoding structures, signal feature extraction and efficient selection of neural network architectures. The neural network decoding structures are designed to identify a context and decode a set of defined tasks associated with a given context. The neural network decoding structures are also configured to update weights for all contexts, thus allowing the neural network decoding structures to "learn" additional contexts and/or tasks within contexts without requiring retraining of the neural network decoding structures. Thus, for example, once trained for a set of tasks associated with Context A, the neural network decoding structures are configured to feedback signals to the weighting nodes of a neural network to "learn" a new set of tasks as a user switches to, for example, a new Context B. Such a system provides for seamless context switching as a user switches between contexts, without requiring retraining/recalibration of the neural network to achieve tasks associated with multiple contexts.

To complete a larger number of actions than has previously been achieved, the present disclosure teaches breaking groups of actions into subsets based on the user's context. For instance, actions relevant for eating, grooming etc. Each context may be assigned its own context-specific decoding weights. In some embodiments, to provide seamless decoding of actions, all decoders may share the same architecture. In other words, the neural network architectures disclosed herein may all have the same number of weights and in the same configuration that are common to all task/contexts. The neural network architectures provided herein may be enabled using transfer learning and unsupervised updating algorithms.

Figure 2:
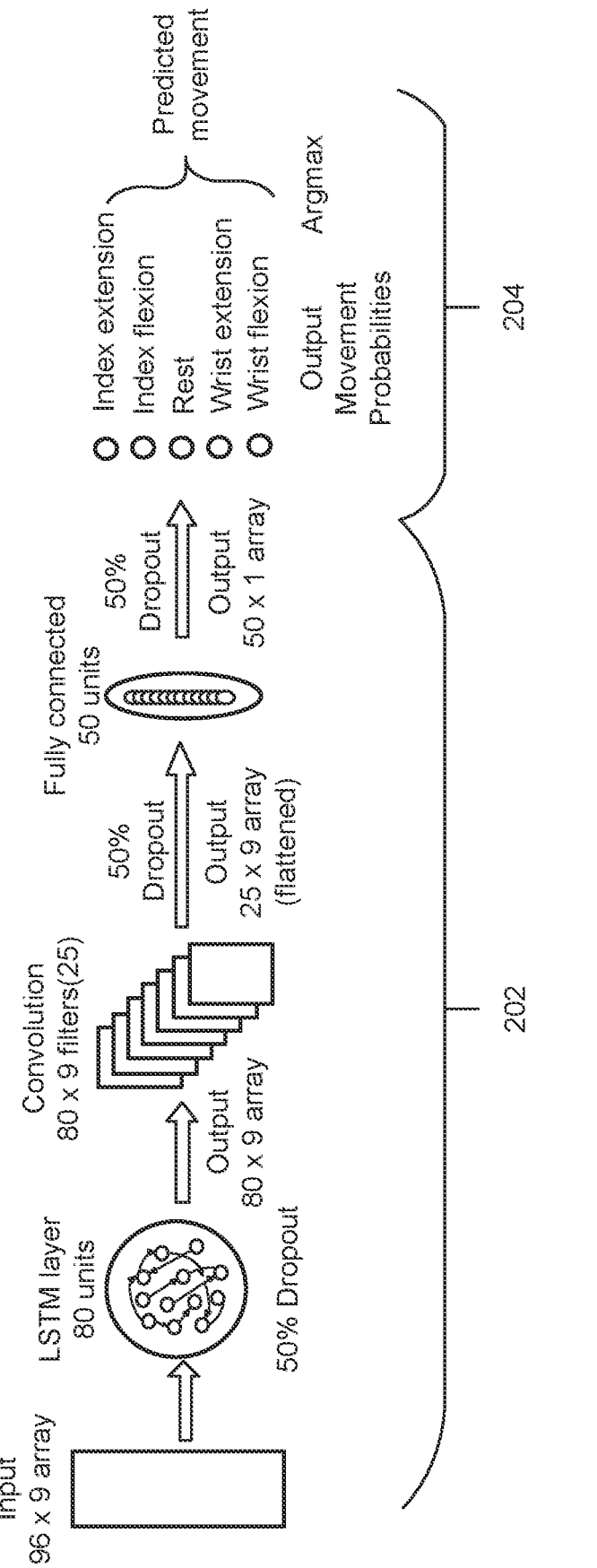
FIG. 2 is an example model built for transfer learning, consistent with the present disclosure.

An example model built for transfer learning is illustrated in FIG. 2. In the example model of FIG. 2, section 202 performs feature reduction from 96×9 features down to 50 features. Section 204 uses the reduced features to train a new classifier.

Using such teaching, the neural network architectures provided herein may update the weights of all the decoders based on data collected from one context. Thus, a large set of possible actions may be maintained for the user, and the decoders may be updated even if that specific context has not been used recently. Furthermore, as disclosed herein, additional information may be leveraged to automatically switch to the most relevant context decoder (i.e., the context decoder most important to the user at a given time). For instance, location sensors could switch contexts based on what room the user is in or certain contexts could be activated based on time of day or a calendar schedule. Other examples of signals that may be used to switch context include, but are not limited to, input signals, location, a button press (either physical or virtual), a neural signal, training data, and/or a training routine associated with a first context.

As disclosed herein, a $3^{rd}$ wave, context-aware AI may be employed to build intelligent decoders with two key innovations: 1) the decoders can update themselves without requiring the user to collect additional calibration data. This unsupervised updating procedure allows the decoder to adapt to changing conditions or disruptions and to meet desired performance requirements; and 2) the decoders can seamlessly switch between different contexts, enabling users to switch the actions controlled by the BCI as they move from one task to another without having to stop to recalibrate the algorithm for the new context.

For instance, the user could start with a sequence of hand grasps to manipulate different household objects, then switch contexts to control multiple smart home devices, then switch contexts again to control a driving simulator and navigate a driving course and finally switch contexts to play a video game. Data collected during one context will be used to update the decoders for all contexts so that when a context is activated the corresponding decoder will be freshly updated and ready to perform at a high-level.

FIG. 1A illustrates a neural interface system 100 according to several embodiments of the present disclosure. The system includes intermediate layer circuitry 102 generally configured to identify one or more tasks 122 within the current context 120 based on one or more input signals 104. The input signals 104 may include for example, brainwave electrical signals (e.g., brain/computer interface signals that may be obtained from implanted sensors (brain implants, etc.), user-worn devices such as a sensor cap, etc.), EMG signals (e.g., sensors to sense user movements such as hand gestures, head movement, etc.), etc. The contexts, including current context 120, may each include a collection of tasks, and a context, as used herein, may be defined as a user experience in a given situation, location, time of day, cursor control for controlling a computer, etc. Example contexts are illustrated at 106′ of FIG. 1B. Context A is a context associated with a user entering their home. Tasks 122 associated with Context A may include, for example, turning on lights, playing music, adjusting a thermostat, closing a door, changing cloths, etc. Context B is a context associated with a user in a living area. Tasks 122 associated with Context B may include, for example, watching TV, playing video games, preparing food, etc. Context C is a context associated with a user in a bedroom. Tasks 122 associated with Context C may include, for example, grooming, dressing, turning lights on/off, etc. The system disclosed herein can seamlessly switch between different functions and devices based on the context. This allows for significantly expanding the number of functions that can be controlled by a BCI while preserving accuracy and speed, and importantly, eliminating the need for recalibration. In addition, the use of contexts allows for reducing the number of tasks that must be decoded, since only the tasks associated with the current context need to be decoded. This reduces the number of computations necessary to decode the tasks, thereby allowing for faster switching between tasks.

The intermediate layer circuitry 102 generally includes decoding circuitry 108 and may also include channel mask layer circuitry 114 and signal transformation circuitry 116. The decoding circuitry 108 may include feature extraction circuitry 110 generally configured to identify one or more features of an input signal 104, which may include, for example, one or more features of a signal (e.g., BCI signal, EMG signal, etc.) associated with one or more tasks and/or one or more contexts. The decoding circuitry 108 also include neural processing circuitry 112 generally configured to identify tasks/contexts based on input signals 104, training data, training routines, etc. In embodiments described herein, the neural processing circuitry 112 may include a combination of neural network architectures. For example, neural processing circuitry 112 may include a long short-term memory (LSTM) neural processing layer generally configured to identify patterns in sequences of data, a convolution neural network layer generally configured for "deep" learning in which input data and feedback data is assigned to one or more nodes of the convolution neural network and selected features may be assigned a weighting factor to enable improve accuracy, and a "fully connected" layer which may include a simple, single-layer neural network architecture. The neural processing circuitry 112 may be initially optimized using calibration data, for example, as may be derived during a training routine to train associated tasks of a context.

Advantageously, the neural processing circuitry 112 is enabled for unsupervised updating of model parameters using new data and predicted output during usage of different (and potentially new) contexts and tasks. This enables seamless context switching without requiring recalibration, training, etc.

The channel mask layer circuitry 114 is generally configured to remove selected input signals, such as unwanted and/or null input signals (for example, from an inoperable/faulty sensor) thus improving the accuracy the decoding circuitry 108 by removing "false" input signals which may influence weighting factors, etc. To that end, "Channel Monitoring with SPC" may be included to statistically identify damaged channels which should be removed by the channel mask layer circuitry 114. The transformation circuitry 116 is generally configured to generate a selected signal type from the raw input signals, for example, transformation of time-based signals into a frequency domain, filtering, digital transformation, etc.

The feature extraction circuitry 110 may be configured to learn optimal features for decoding either BCI or EMG data streams. Traditional decoding frameworks use a 2-step process. In the first step, the raw voltage data is converted into a set of static features, for instance the root mean squared error or the spectral power in a given time window. Other static features may be designed to capture known properties of the signal, for instance threshold crossing rates in BCI data are meant to approximate the rate of neural spikes. Critically, these features are calculated using a fixed formula that is not adapted to the individual or the task. In the second step, the features are input into a machine learning algorithm to build a predictive model that estimates the user's intent from the features. The predictive model is optimized using data for performance on a given task for that user.

In contrast, as disclosed herein, the two steps are combined into a unified architecture where the raw voltage data is input into a model that both creates features and predicts the user's intent. Both of these steps may be simultaneously optimized for performance on the given task and individual. For example, the feature extraction circuitry 110 may be configured to pull commonly used static features for BCI (threshold crossings and wavelets respectively) into a deep neural network framework and allow for the parameters of the features to be optimized simultaneously with the decoder. In addition, the feature extraction circuitry 110 may be configured for coherent channel combination, which may be applied to EMG and/or BCI data streams.

In some embodiments, the disclosed system includes trainable neural network layers that implement feature extraction functions. These learnable (through backpropagation) feature extraction functions remove the need to handcraft features to extract information from EMG devices. In some embodiments, the feature extraction functions are implemented as layers in the machine learning library PyTorch, and therefore the feature extraction layers can take advantage of Graphics Processing Unit (GPU) hardware for fast execution.

The disclosed approach has several distinct advantages. First, the data transforms can be performed on GPU hardware with all the computation advantages that a GPU has over a Central Processing Unit (CPU). Second, with the data transform implemented as a layer in the model, it allows certain transform parameters to be learned during training through backpropagation. This creates a unified framework to optimize both the features and decoder jointly as well as integrating all the other improvements inherent in the disclosed approach, such as unsupervised updating and data augmentation. Third, the code is simplified since the feature extraction is merged with the decoder and thus the data loading step is the same regardless of the feature transforms. Finally, it is possible to implement multiple transforms in parallel and have the model learn which transforms are most informative during training.

The significant aspects of the disclosed system include leveraging GPU hardware for fast execution, learning features and hyperparameters from the raw data, allowing for unique architectures that utilize multiple features, and the disclosed system can be used to select optimal features.

The standard way to calculate the threshold crossing at a time point is using a hard threshold function as shown in Formula (1).

$$y = \begin{cases} 0 \text{ if } x < \text{thresh} \\ 1 \text{ if } x >= \text{thresh}. \end{cases} \quad \text{Formula (1)}$$

However, the derivative of this function is not defined at the threshold and is zero everywhere else. As such, it would not allow for use of backpropagation to update the value of the threshold. To overcome this, the disclosed system uses a sigmoid function as a smooth approximation for a hard threshold. The sigmoid thresholding function is defined in Formula (2).

$$y = \frac{1}{1 + e^{c(-x+thresh)}} \quad \text{Formula (2)}$$

In Formula (2), c is a scaling parameter that varies the steepness of the threshold. A value of c=1 gives a soft threshold function and values of c>1 give harder thresholds which more closely approximate the hard threshold function and have steeper derivatives. A challenge to this approach is finding a value of c that gives a good approximation to the hard threshold function while still being amenable to backpropagation.

The discrete wavelet transform is a powerful tool in signal processing, and it has shown success in BCI applications. The wavelet transform consists of filtering and downsampling the original signal. Since PyTorch contains fast, GPU enabled functions for performing convolution, in some embodiments the disclosed system leverages these functions to compute the wavelet transform.

In some embodiments, the PyTorch 1D convolution layer is used to implement the discrete wavelet transform in PyTorch. The bias term is set to zero, and the convolution coefficients are set based on the chosen wavelet. The available wavelet filter coefficients are loaded from the pywavelet package. In addition to the discrete wavelet transform, the wavelet packet transform is also implemented. The wavelet packet transform further breaks down the signal at each level based on frequency. Both the discrete wavelet transform, and the wavelet packet transform PyTorch implementations were tested against the pywavelet package implementations. The outputs of the PyTorch and pywavelet implementations were found to be identical to machine precision.

Current neural decoders rely on handcrafted features to extract information from BCI devices. The most common feature is threshold crossing which requires a hand tuned value to estimate the threshold. The present disclosure includes a differentiable function that approximates the thresholding function. Since the function is differentiable, the hyperparameters can be learned via backpropagation from the data. In addition, the present disclosure includes a function that can separate the input signal into multiple regions using two or more threshold values.

By using differentiable functions to approximate the thresholding operation, the disclosed system can learn hyperparameters from the data through backpropagation. Previous work would calculate threshold crossings using a fixed hyperparameter and train a model separately. The disclosed approach allows for hyperparameter-free feature extraction and model training in one step.

Some significant features of the disclosed system include the use of sigmoid functions to approximate the thresholding step, and the integration of threshold feature extraction into deep learning libraries and during model training. Since the hyperparameters of the threshold crossing function are learned from the data, the disclosed method achieves or beats the performance of hand-tuned hyperparameters and avoids the need to extract features and train a model as two separate steps.

In some embodiments, the threshold layer uses a scaled sigmoid function to compute the threshold crossings. Disclosed herein is a new technique that uses two threshold values to create two threshold features per channel. Also introduced are several variations of the thresholding models that learn different thresholds for each channel. The system uses a genetic algorithm to optimize the threshold values in order to eliminate possible issues with vanishing gradients. Described below is the multiple threshold model.

Figure 3:
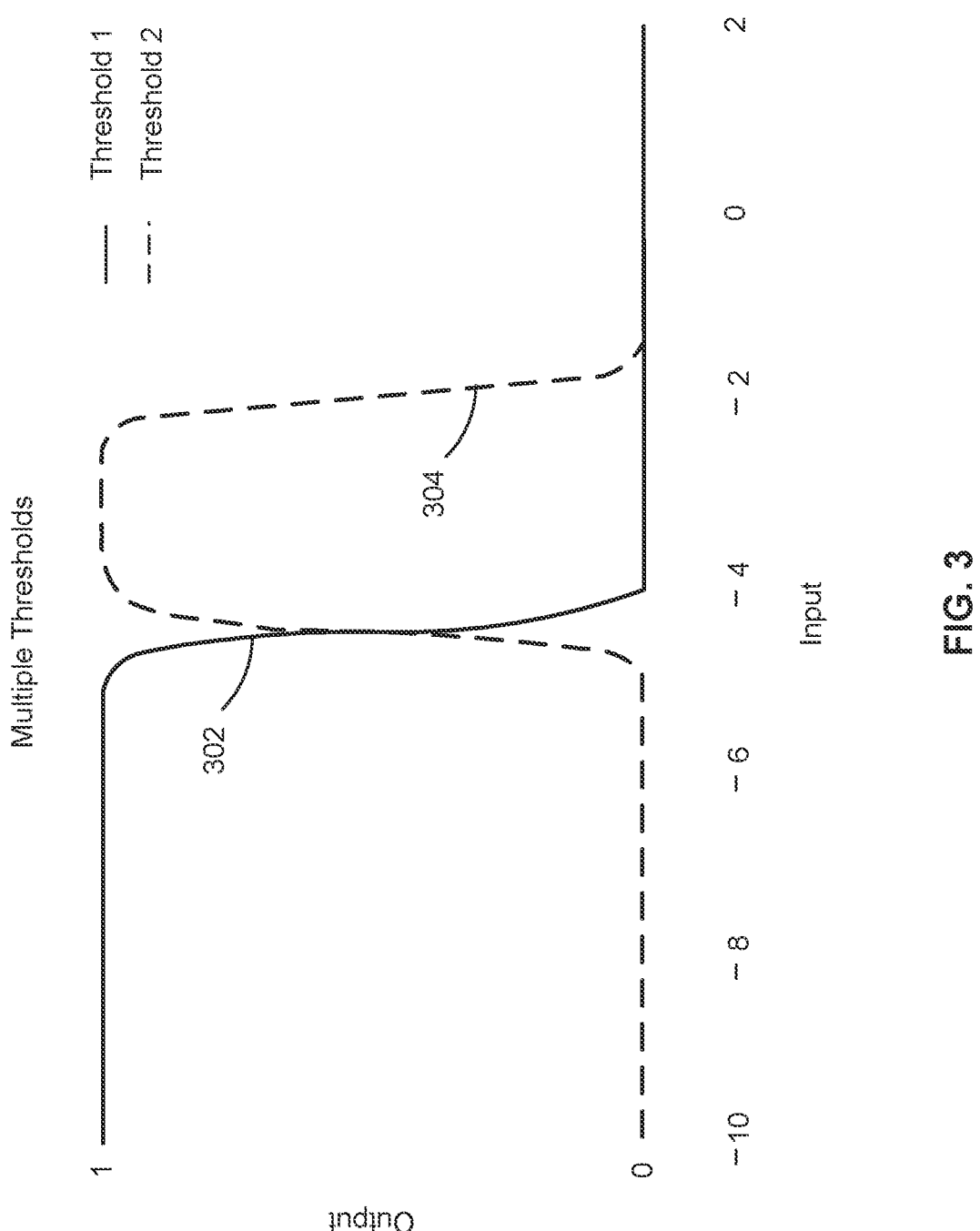
FIG. 3 is an example multiple threshold model using two thresholds, consistent with the present disclosure.

The multiple threshold model separates the data into two or more categories based on the amplitude of the data. FIG. 3 is an example multiple threshold model using two thresholds. In this case, the thresholds are manually set to −4.5 and −2. To create the functions shown in FIG. 3, a modified sigmoid function is used. The sigmoid function used here is given by Formula (3)

$$S(x, t) = \frac{1}{1 + e^{c(-x+t)}} \qquad \text{Formula (3)}$$

In Formula (3), c is a constant that controls the steepness of the sigmoid function and t is the threshold value. The threshold-1 302 and threshold-2 304 lines are calculated using M_1 and M_2, respectively. M_1 and M_2 are given by Formula (4) and Formula (5).

$$M_1(x, t_1) = S(x, t_1) \qquad \text{Formula (4)}$$

$$M_2(x, t_1, t_2) = S(-x, -t_1) \times S(x, t_2). \qquad \text{Formula (5)}$$

When applied to neural data, the disclosed multiple threshold model produces two features per channel. The first feature is activated for values below $t_1$, and the second feature is activated for values between $t_2$ and $t_1$ (note that these are soft thresholds so there is a small transition region where the features take values between 0 and 1). For simplicity, described is a multiple threshold model that utilizes two thresholds, but the extension to three or more thresholds is straight forward.

In some embodiments, each model has three common elements. The first is the threshold crossing calculations. The preprocessed data are passed to the threshold crossing layer that takes a data sample within a range of approximately 25-200 ms, and calculates the number of threshold crossings in that sample. Thresholds are calculated by dividing the data sample into bins in a range of approximately 2-10 ms and calculating the minimum value in each bin. The minimum value for each bin is then passed through the thresholding function. The rate of threshold crossings is calculated by taking the mean of the threshold crossings across each data sample time bin. After the threshold rates have been calculated, a moving average time of the threshold crossings in a range of approximately 500-2000 ms is taken, which includes the most recent data sample and the preceding (moving average time minus the data sample time) of data. Finally, the output of the moving average filter is passed to a logistic regression function. For example, with a data sample size of 100 ms, a bin size of 4 ms, and a moving average time of 1 second, the moving average of the threshold crossings would be 900 ms.

In some embodiments, an algorithm is included to mathematically align recordings from EMG electrodes before they are fed into a decoder model. In one instance, this may be used to align the same subject across different sessions where there may be differences in the placement of electrodes from session to session. In another instance the system may need to align from one subject to a different subject. In a third instance the system may need to align multiple subjects to a common reference. The alignment algorithm may be applied either directly to data recorded on each electrode or to a loadings matrix that maps the electrodes to a set of components, where the number of components is less than or equal to the number of electrodes.

Only a brief number of trials or even rest data is needed to collect a calibration dataset that can be used to calculate an alignment matrix between the new user's data and the dataset used to initially train the model. The user's data can then be multiplied by the alignment matrix before being fed to the decoder algorithm. No additional model-fitting is required.

In one illustrative example, an EMG sleeve, a wearable device for people with mobility issues, includes a number of recording electrodes to measure muscle group activity. Variable placement of the sleeve implies that the same muscle responses may be reflected on different sets of electrodes on different users, or even on the same user once the sleeve has been removed and put back on. Therefore, the decoder algorithm to map electrode recordings to intended movements must be updated every time a user puts on the EMG sleeve. This requires time and effort on the user's part to collect the training data, as well as computational resources to retrain the decoder.

The disclosed system applies standard statistical techniques to realign EMG electrode signals between different users so that a single decoder model may be used to map electrode signals to movements for all users with minimal modification or retraining efforts. An additional benefit to the alignment is that it allows simpler models such as support vector machines and logistic regression to attain high performance. These require far less time and fewer computational resources to train than neural networks, which are more commonly used as EMG decoder models.

The present disclosure utilizes a Procrustes transform that can be performed without requiring the dimension reduction step and the stable electrode identification of other systems. It has been found through development of the present disclosure that the factors identified by dimension-reduction techniques do not always align with the factors that are most predictive of movement intention.

Unlike existing systems, the alignment matrix does not need to be explicitly trained in a neural network. This reduces computational requirements, and also reduces the time needed to collect training data from the subject.

Figure 4:
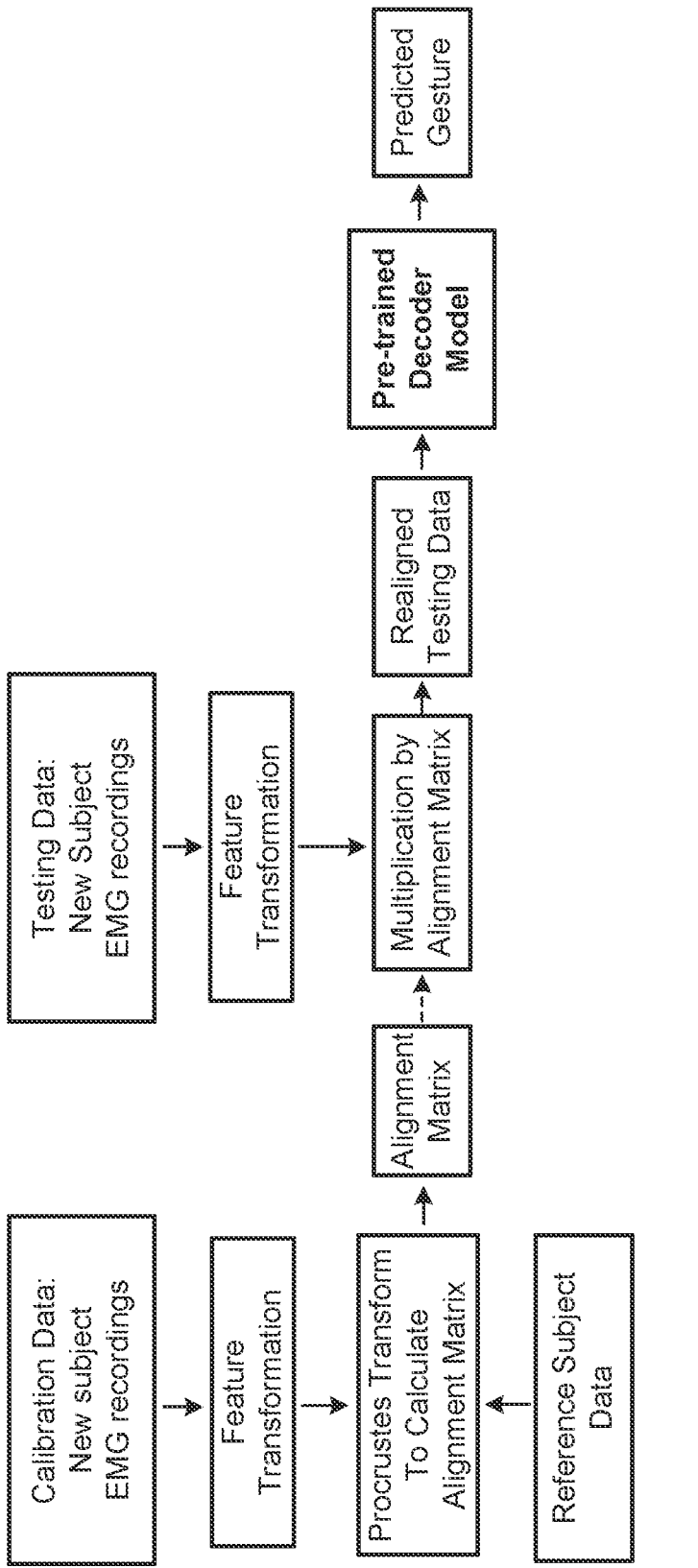
FIG. 4 is an example schematic of an electrode alignment system, consistent with the present disclosure.

The present disclosure works in conjunction with an EMG system and a decoder to map electrode recordings to intended movements. The electrode alignment allows for generalization of the decoder, so it can be used across multiple sessions and users without extensive retraining. FIG. 4 shows an example schematic of the disclosed electrode alignment system. Calibration data from a new subject can be used to calculate an alignment matrix that minimizes the disparity between the new subject's recordings and reference data. This matrix can then be multiplied by future data from the test subject before it is fed to a decoder model. The alignment process may also be applied to a loadings matrix resulting from factor analysis, principal components analysis, or another dimension reduction approach, rather than to the EMG recordings themselves.

In some embodiments, the system disclosed herein may use methods which simultaneously learn features from raw, unprocessed data as they are trained to perform a specific task, which is referred to as an "end-to-end" deep learning system. The end-to-end deep learning system solves long-standing problems with neural interface decoder optimization and maintenance while improving accuracy and robustness. To accomplish this goal, the disclosed system may use a hybrid approach for stable long-term neural decoding, first, using end-to-end deep neural network (eeDNN) decoders to learn optimal features from the raw electrode recordings, and second, adjusting both the features and the decoder on-the-fly during normal system use to counteract non-stationarities in the signal and other recording instabilities without requiring the user to invest time in recalibrating the system. This is illustrated in FIG. 5.

Figure 5:
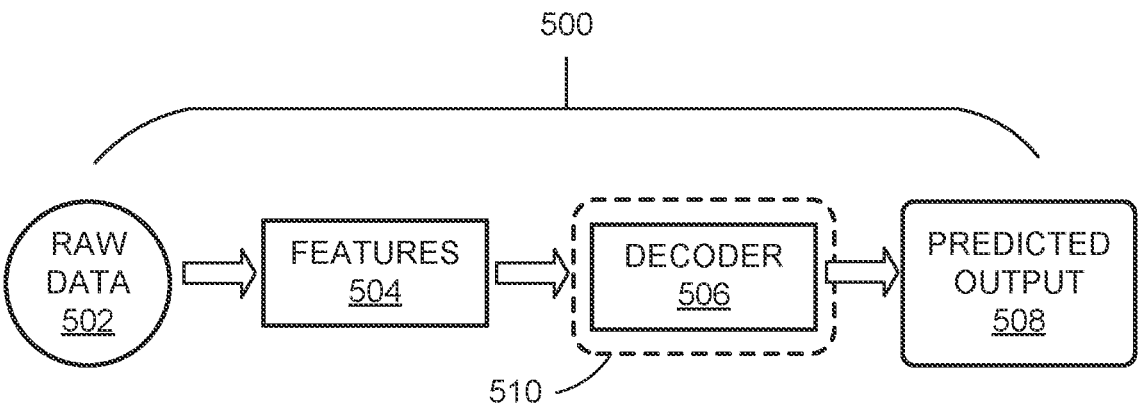
FIG. 5 is an example method to simultaneously learn features from raw, unprocessed data, consistent with the present disclosure.
Figure 5:
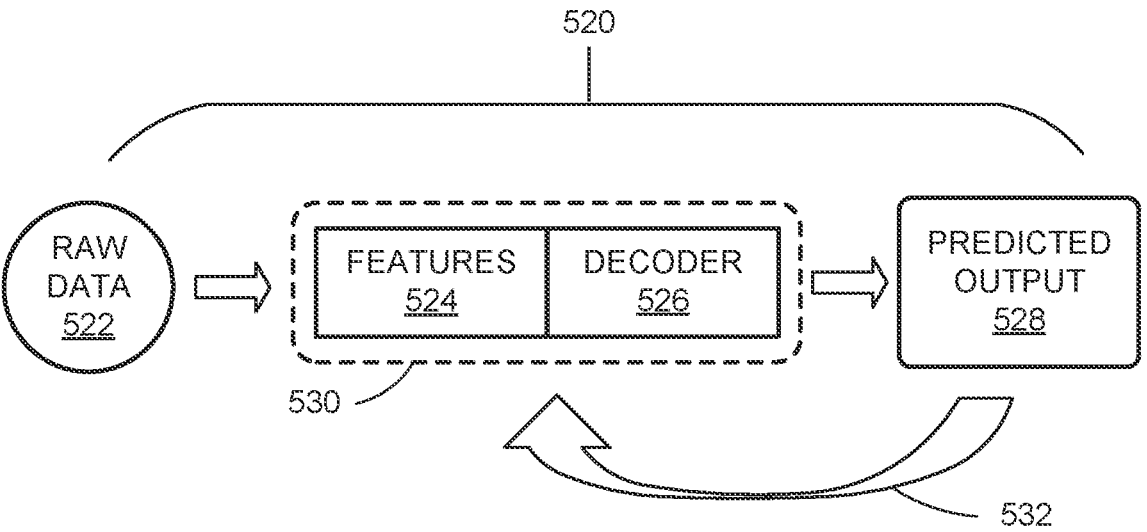

Most existing brain-computer interface (BCI) systems use a two-step approach to build a decoder, as illustrated by existing training model 500 of FIG. 5. First, a static, standard set of features 504 (e.g., threshold crossings, spikes, or spectral data) are extracted from the raw neural data 502 to create a training dataset. Next, a statistical or machine learning model, the neural decoder 506, is calibrated to predict the user's intended action, i.e., predicted output 508, from the features. Calibrating the decoder typically requires the user to imagine performing several cued, or scripted, actions in a controlled sequence, so that the decoder can learn to associate specific patterns of neural activity with the intended action using data where the intended action is explicitly known, a process known as supervised learning. However, due to a variety of factors including electrode micromotion, glial scarring, neuronal changes, and the user's cognitive state, neural activity is highly variable from day-to-day. This variability violates the assumptions of standard statistical decoding models which assume the mapping between neural activity and intended action remains fixed over time. Decoders that do not account for this variability generally experience a steady decay in performance over time. A common approach to counteract this decay is requiring the user to spend time each day recalibrating the decoder. This approach has two significant limitations which are overcome by the present disclosure.

The first limitation is that, unlike the decoder, the standard, static features are not explicitly optimized for performance. This suggests that significant gains in decoder performance can be made by optimizing the input neural features to maximize decoder performance. Instead of constraining the search for optimal features to use threshold crossings (or another specific feature), the disclosed system learns the features from the raw data during normal use, optimizing explicitly for accuracy and temporal robustness while imposing minimal assumptions on the structure of those features. Examining these learned features could then lead to a better understanding of the underlying processes being decoded.

The second limitation is the requirement for frequent decoder recalibration, a significant and undesirable time commitment from the user. Surveys of potential BCI users revealed a clear desire that after an initial learning period the user should be able to effectively use the neural interface without having to recalibrate the algorithms prior to each use.

To overcome this limitation, the disclosed system introduces a novel unsupervised updating method that enables re-optimization of the decoder using general use data—data where, unlike calibration data, the user's intended action is not available to the algorithm. Like the existing training model 500 of FIG. 5, the disclosed training model 520 starts with raw neural data 522 to create a training dataset. In the disclosed training model 520, the raw neural data 522, however, is used to train both the features 524 and the neural decoder 526 together, as shown by block 530. In the disclosed system, predicted output 528 is back propagated to both the features 524 and the neural decoder 526 during general usage to optimize both the features 524 and the neural decoder 526. This is the unsupervised updating that enables re-optimization of the decoder using general use data. In actual testing, this approach proved to be a significant improvement over holding the model fixed—a full year after it last was exposed to calibration data, the unsupervised updating model performed on par with a model that was recalibrated each day with fresh calibration and significantly outperformed other commonly used baselines.

The disclosed unsupervised updating approach leverages data generated as the participant uses the system, where the user's intent, commonly referred to as a label in machine learning terminology, is unknown. As data passes through the decoder, the predicted intent from the model can be used to provide tentative, noisy labels for the data. These noisy labels can then be combined with the historical training data and used to update the model weights to minimize a loss function that is modified to accommodate the noisy, less reliable data. This stands in contrast to supervised updating where explicit knowledge of the type and timing of the user's intent is required, necessitating the frequent collection of calibration datasets.

Spectral features are an appealing alternative to noisy spike and threshold-based features. The system disclosed herein has demonstrated that spectral power features can reliably capture neural information and perform favorably on real-world BCI datasets. One way to extract spectral information is the use of wavelet signal decomposition that may use either DWT or the WPT transform layers. In some embodiments, a PyTorch implementation may be used. There are a few advantages of implementing the DWT and WPT in PyTorch. The first is access to hardware acceleration in the form of a GPU. The second is the ability to optimize wavelet filters via backpropagation. Finally, with multiple transform layers, the system can generate multiple features in parallel with the potential to learn optimal features.

In various embodiments, the disclosed system may use these transforms in the development of two sets of features for decoding. In some embodiments, the static Mean Wavelet Power (MWP) feature is converted into a PyTorch layer where its efficacy is verified compared to the features generated in the usual way and then the parameters can be optimized in an end-to-end manner. In some embodiments, a new spectral feature, the mean wavelet packet power (MWPP) feature is used, which enables a different parsing of the frequency space while maintaining many of the desirable features of the original MWP feature.

Both the DWT and WPT consist of filtering and downsampling the original signal. The filters separate the signal's Fourier spectrum into non-overlapping sections. For example, the single level DWT produces two bands with frequency coverage $b_1=[0, F_s/4]$ and $b_2=[F_s/4, F_s/2]$, where $F_s$ is the sampling rate in Hz. The second level of decomposition takes the lowest frequency band and again splits it into two resulting in three bands $b_1=[0, F_s/8]$, $b_2=[F_s/8, F_s/4]$, and $b_3=[F_s/4, F_s/2]$. In contrast, the WPT passes all frequency bands to the next level. The second level WPT will result in four bands $b_1=[0, F_s/8]$, $b_2=[F_s/8, F_s/4]$, $b_3=[F_s/4, F_s*\frac{3}{8}]$, and $b_3=[F_s*\frac{3}{8}, F_s/2]$. Notice that unlike the DWT, each band of the WPT has equal bandwidth $F_s/8$. The resulting wavelet coefficients have finite time and frequency resolution. In contrast, the Fourier transform has perfect frequency resolution, but infinite time resolution. A simple example of this the Fourier transform of an infinite length sinusoid is a delta function. In other words, an infinite time signal is mapped to a single point in frequency.

In some embodiments, the disclosed system may use the MWP, which is an excellent neural feature for decoding that requires no day-to-day manual tuning. The original MWP feature is generated by first averaging the wavelet power within each frequency band and then averaging the resulting bands together. In an embodiment, to calculate the MWP, 100 ms of raw data is passed through a multi-level DWT. The mean of the absolute value of each wavelet band is taken over time, resulting in an array $[N_{levels}, N_{channel}]$. Certain levels of the wavelet decomposition are selected from this array, based on the desired frequency range of the resulting MWP feature. The selected levels are then averaged to create a single MWP feature per channel.

To test the efficacy of the implementation of the MWP, two models were trained. The first model utilized the MWP features generated using the old approach and the second used MWP features generated online during training. Both models were trained using data from the same days, and the random seed for each model was preserved.

Figure 6:
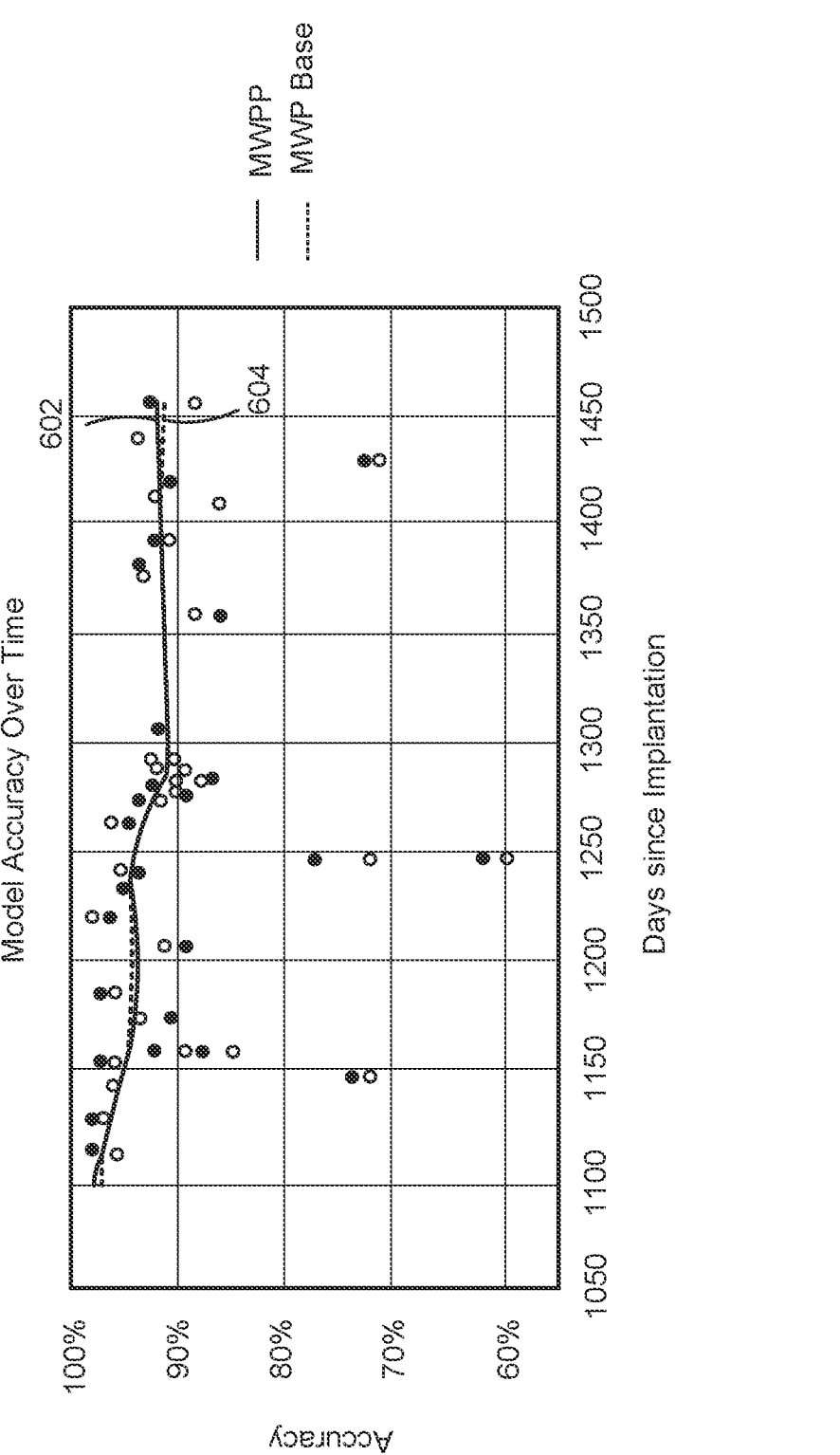
FIG. 6 is an example graph of the results from both a Discrete Wavelet Transform (DWT) model and a Wavelet Packet Transform (WPT) model.

To further refine the wavelet features, some embodiments may use Mean Wavelet Packet Power (MWPP) features that leverage the WPT instead of the DWT. The main difference between the MWPP and the MWP is in the bandwidth of each wavelet band. The WPT divides the signals spectrum equally between the number of bands. For example, a 4 level WPT decomposition of a signal sampled at 30 kHz will have $2^4=16$ bands, each with a bandwidth of $15,000\sqrt{}/16=937.5$ Hz. In a 5-level decomposition, each band will have a bandwidth of 468.75 Hz. This allows for a more fine-grained segmentation of the signal's spectrum (for comparison the largest bandwidth in the MWP is 7500 Hz). The results for both models are nearly identical, as can be seen in the graph of FIG. 6. In the graph of FIG. 6, trace 602 is the MWPP, while trace 604 is the MWP base.

The neural processing circuitry 112 may be configured and/or selected using conventional and/or proprietary tools for architecture selection and configuration. For example, the neural processing circuitry may be selected using a Differentiable Architecture Search (DARTS). DARTS is an approach to reduce the computational complexity required to find high performance architectures for various tasks, which employs a bi-level optimization problem that optimizes both the neural network parameters and the architecture graph connections.

In some embodiments, DARTS is used to reduce the computational complexity required to find high performance architectures for various tasks. Previous approaches to architecture search require training individual models with hyperparameters chosen to satisfy some type of grid or evolutionary search of the architecture space. DARTS allows a more efficient search of the architecture space by jointly learning the neural network parameters and architecture connections using a gradient descent.

In some embodiments, the DARTS algorithm is posed as a bi-level optimization problem that optimizes both the neural network parameters and the architecture graph connections. This neural network parameters and architecture graph connections are graphed in FIG. 7. The graph of FIG. 7 includes network parameters 702 and graph connections 704. To jointly optimize both network parameters and graph connections, the disclosed system descends the gradient of the loss function applied to two different sets of data, training sets and validation sets. The training data is used to optimize the network parameters while the validation data is used to optimize the graph connections. The loss function is chosen based upon the type of task to be performed. A summary of the algorithm is shown in Formula (6) below.

DARTS as currently used is implemented for searching architectures with block-like structures. The method disclosed herein implements DARTS in a different manner resulting in a key difference. In some embodiments, DARTS involves the definition of a directed acyclic graph (DAG) representing all potential architecture choices to search. In this formulation, the solution to the architecture search may not result in the smallest architecture. For the application of neural decoding, the disclosed method favors high performing small models that can be efficiently deployed to edge computing devices. Given this preference for smaller models, in some embodiments the cost function of the original DARTS formulation is augmented to promote finding small models.

Figure 7:
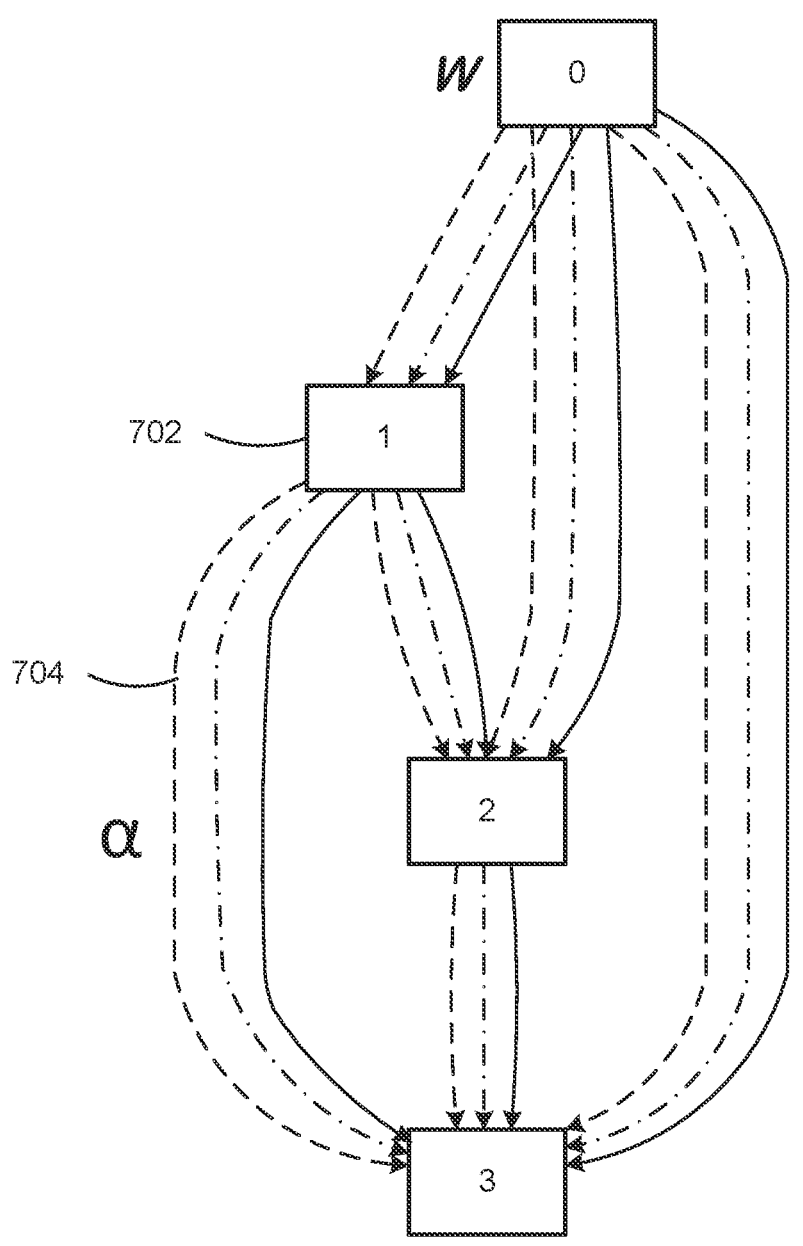
FIG. 7 is an example neural network parameters and architecture graph connections for a Differentiable Architecture Search (DARTS) algorithm, consistent with the present disclosure.

Promoting the discovery of small models can be viewed as learning a sparse representation of the graph connections shown in FIG. 7. To learn a sparse representation, the cost function may be augmented with an entropy loss. The augmented cost function in shown in Formula (7) and Formula (8) below.

$$\mathcal{L}_{val} = \mathcal{L}_{acc} + \lambda \mathcal{L}_{ent} \qquad \text{Formula (7)}$$

$$\mathcal{L}_{ent} = \frac{1}{N} \sum_{\{a\}} \left( -\sum_{i} \alpha_i \log \alpha_i \right) \qquad \text{Formula (8)}$$

In Formula (7) and Formula (8), $\mathcal{L}_{val}$ refers back to the loss defined in the algorithm in Formula 6, and is the loss used to optimize the alpha values. $\mathcal{L}_{acc}$ is a general loss that ensures that the model does not trade a sparse solution for a less accurate solution. The choice of $\mathcal{L}_{acc}$ is task dependent. $\mathcal{L}_{ent}$ is the entropy loss defined in Formula 8.

The first loss term promotes model accuracy for the task while the second loss term is an entropy loss that promotes sparsity of the graph connections. Also included is a scaling factor for the entropy loss, because setting the scaling factor to one does not always produce expected results. This may be due to different sets of parameters in the neural network converging at different rates. Instead of fixing the scaling factor, in some embodiments the scaling factor may be initially set to zero for a set number of epochs before setting the scaling factor to a non-zero value.

In some embodiments, the DARTS method disclosed herein may be used for architecture selection tasks. In various embodiments, the DARTS method may be used to examine the selection of feature extraction layers at the head of a neural network. The DARTS method may also be used to explore optimizing an existing architecture by searching a small space of hyperparameters. The DARTS method may also be used for an architecture search to select a network that is robust over time. These three tasks are discussed in detail below.

In one embodiment, the task is feature extraction selection. As disclosed herein, mean wavelet power works well as an input feature to neural networks for decoding motor intentions from BCI signals originating in the motor cortex.

while not converged do                                              Formula (6)

1. Update architecture $\alpha$ by descending $\nabla_a \mathcal{L}_{val}(w - \xi \nabla_w \mathcal{L}_{train}(w, \alpha), \alpha)$ $(\xi = 0$ if using first−order approximation$)$ 2. Update weights $w$ by descending $\nabla_w \mathcal{L}_{train}(w, \alpha)$ Derive the final achitecture based on the learned $\alpha$.

However, mean wavelet power may not work well in all cases and for all users. Therefore, in some embodiments, DARTS framework disclosed herein offers an efficient way to select these feature extraction transforms from potentially different signal sources such as an EMG device.

In another embodiment, the task that may be accomplished by the disclosed DARTS framework is hyperparameter search. As mentioned above, in a network architecture that works well for decoding motor intentions from mean wavelet power features, the hyperparameters for that network architecture were previously hand selected. The disclosed DARTS is a framework for efficiently optimizing the network hyperparameters for various tasks as well as individual users.

Figure 8:
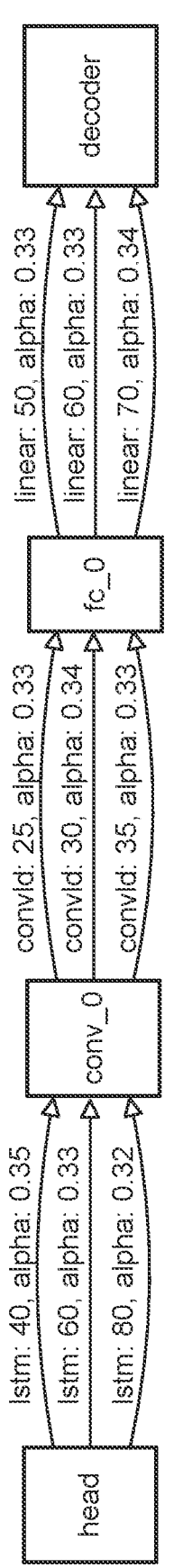
FIG. 8 is an example network architecture optimized with DARTS, consistent with the present disclosure.

The network architecture disclosed herein optimized with DARTS is referred to as the "Nature Medicine" architecture. The architecture consists of an LSTM layer followed by one dimensional (1D) convolution and a linear layer. The hyperparameters of these layers were originally hand chosen and the method may optimize these hyperparameters by building a graph for DARTS that span some values for the hyperparameters. This is shown in FIG. 8.

In some embodiments, the size of the hidden dimension may be varied for the LSTM layer. In some embodiments, the number of filter kernels may be varied for the 1D convolution layer. And in some embodiments, the output size may be varied for the linear layer. It can be seen from FIG. 8 that hyperparameter selection is accomplished by learning the optimal path through the graph.

In another embodiment, the final task that may be accomplished by the disclosed DARTS framework is robust architecture search. A problem that must be overcome for any take-home neural decoding system is performance degradation over time. The performance of some neural decoders degrades over time if they are not retrained using more recent data. This can most likely be attributed to variation in day-to-day neural activity. Retraining models can be computationally expensive and time-intensive, which are both prohibitive in a take-home device environment. The present disclosure is a robust architecture selection can efficiently be performed with DARTS.

Figure 9:
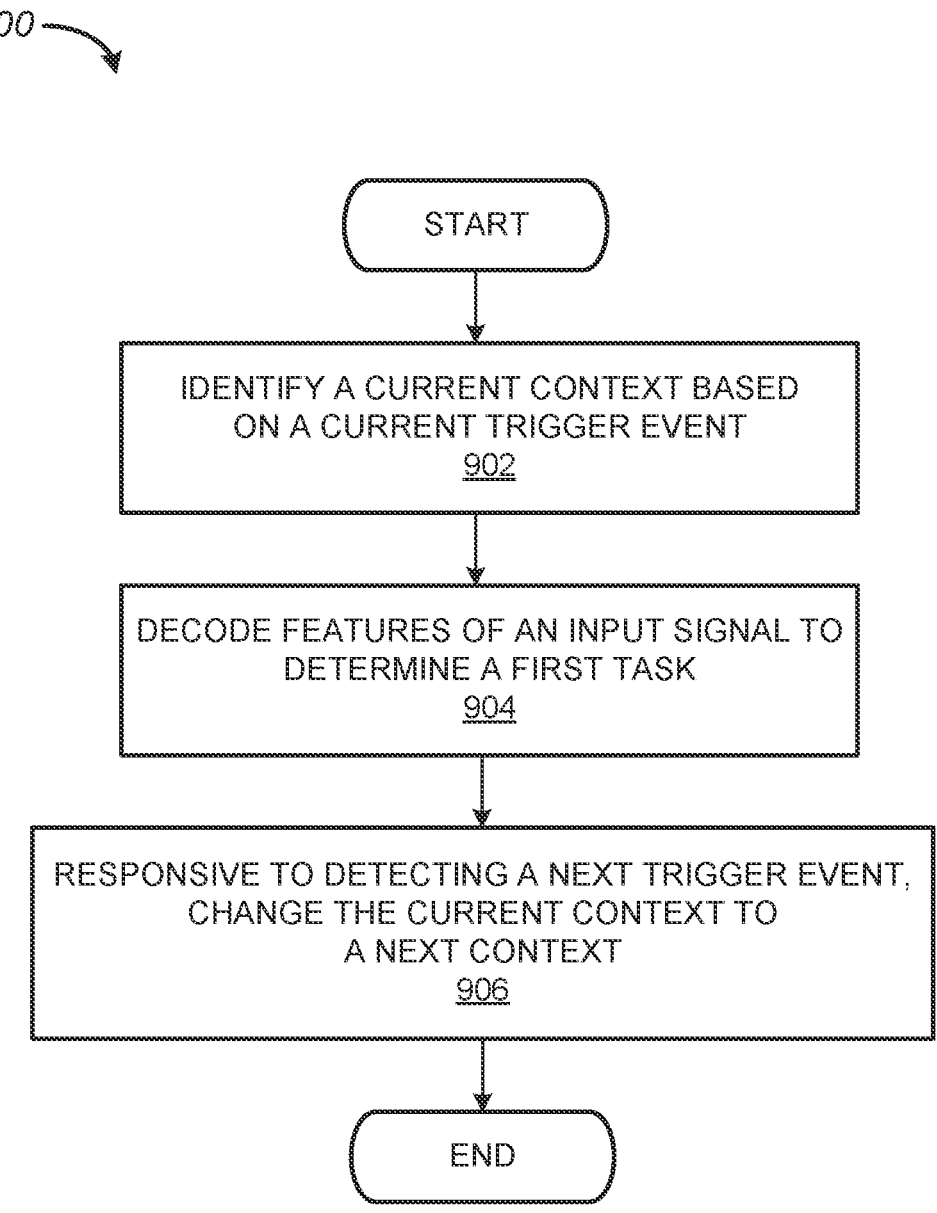
FIG. 9 is a flow chart diagram of workflow 900 for neural interface systems, in accordance with an embodiment of the present disclosure.

FIG. 9 is a flow chart diagram of workflow 900 depicting machine-readable instructions contained on a non-transitory storage device that, when executed by one or more processors, cause one or more processors to perform the following operations, in accordance with an embodiment of the present disclosure. It should be appreciated that embodiments of the present disclosure provide at least to neural interface systems. However, FIG. 9 provides only an illustration of one implementation and does not imply any limitations with regard to the environments in which different embodiments may be implemented. Many modifications to the depicted environment may be made by those skilled in the art without departing from the scope of the disclosure as recited by the claims.

Operation 902—identify a current context based on a current trigger event. In the illustrated example embodiment of workflow 900, a current context is identified based on a current trigger event, where the current trigger event may include at least one of the one or more features of a second input signal, a location, a button press, a manual signal, a brainwave electrical signal, training data, and/or a training routine associated with a context, and combinations thereof.

Operation 904—decode features of an input signal to determine a task. In operation 904, the features that have been extracted from the input signals by the feature extraction layers, e.g., feature extraction circuitry 110 of FIG. 1A, are passed through the decoding layers, e.g., neural processing circuitry 112 of FIG. 1A, to select a task from the possible tasks associated with the current context. An example of tasks that may be associated with a specific context are illustrated in FIG. 1B. For example, for a current context "A enter home," the associated tasks may include turn on the lights, play music, adjust thermostat, close the garage door, and set Functional Electrical Stimulation (FES) grips for changing clothes.

Operation 906—responsive to detecting a next trigger event, change the current context to the next context. In operation 906, when a next trigger event is detected that indicates that the current context is no longer the desired context, the current context is changed to a next context based on the trigger event. The next context then becomes the current context. Similar to the current trigger event of operation 902, the next trigger event may include at least one of the one or more features of a second input signal, a location, a button press, a manual signal, a brainwave electrical signal, training data, and/or a training routine associated with a context, and combinations thereof.

In some embodiments, any new data, and the predicted output during usage of the current context, are fed back to update one or more model parameters of the neural network decoding model, e.g., decoding circuitry 108 of FIG. 1A. This unsupervised updating algorithm is continuously applied, so when the current context is changed to a next context due to detecting a trigger event, the next context becomes the current context, and the unsupervised updating algorithm will continue to update the model parameters of the neural network decoding model using the new data and the predicted output for all previous contexts as the system changes from one context to another context. Therefore, the model parameters of the neural network decoding model are updated for the new data and the predicted output from any previously collected contexts.

According to one aspect of the disclosure there is thus provided a neural interface system, the system including feature extraction circuitry to identify one or more features of one or more input signals; and neural processing circuitry. The neural processing circuitry is configured to: identify a first context of a plurality of contexts based on a first trigger event; decode the one or more features of the one or more input signals to determine a first task of a plurality of tasks in the first context; and responsive to detecting a second trigger event, change the first context to a second context of the plurality of contexts.

According to another aspect of the disclosure there is thus provided a non-transitory storage device that includes machine-readable instructions that, when executed by one or more processors, cause one or more processors to perform operations, the operations comprising: identify a first context of a plurality of contexts based on a first trigger event; decode the one or more features of the one or more input signals to determine a first task of a plurality of tasks in the first context; and responsive to detecting a second trigger event, change the first context to a second context of the plurality of contexts.

According to yet another aspect of the disclosure there is thus provided a method for selecting neural network architectures, the method including: determine a directed acyclic graph (DAG) representing all potential architecture choices to search; determining a first loss function applied to a set of training data using the DAG; determining a second loss function applied to one or more sets of validation data using the DAG; optimizing a plurality of neural network parameters based on the first loss function applied to the set of training data; optimizing one or more architecture graph connections based on the second loss function applied to the one or more sets of validation data; and determining a final architecture based on a result of optimizing the one or more architecture graph connections based on the second loss function applied to the one or more sets of validation data.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hard-wired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations associated with any of the circuitry described herein, and/or any of the functional components illustrated and described in any of the figures of the attached appendices, may be implemented as program code, instruction sets, applications, etc. These operations may be implemented in a system that includes one or more non-transitory storage devices having stored thereon, individually or in combination, instructions that when executed by circuitry perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including," and "having" are intended to be inclusive and mean that there may be additional elements other than the listed elements.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the memory may store instructions (in, for example, firmware or software) to perform the operations described herein. The storage medium may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

What is claimed is:

1. A neural interface system, comprising:
feature extraction circuitry to identify one or more features of one or more input signals; and
neural processing circuitry, the neural processing circuitry configured to:
identify a current context of a plurality of contexts based on a first trigger event;
decode the one or more features of the one or more input signals to determine a first task of a plurality of tasks in the current context;
responsive to detecting a second trigger event, change the current context to a next context of the plurality of contexts; and
build a neural network decoder directly from raw data, wherein build the neural network decoder further comprises:
learn the one or more features of a deep neural network directly from the raw data; and
adjust the one or more features and the neural network decoder based on a predicted output during normal use, wherein adjusting the features and the neural network decoder during normal use does not require recalibration by a user.

2. The neural interface system of claim 1, wherein the first trigger event and the second trigger event each includes at least one of the one or more features of a second input signal, a location, a button press, a manual signal, a brainwave electrical signal, training data, and/or a training routine associated with a context.

3. The neural interface system of claim 1, wherein the neural processing circuitry is further configured to:

update one or more model parameters of the neural processing circuitry for any context of the plurality of contexts using new data and predicted output during usage of the current context, wherein the one or more model parameters of a neural network decoding model are updated for all previously collected contexts.

4. The neural interface system of claim 1, wherein the feature extraction circuitry is configured to identify the one or more features of a brain-computer interface (BCI) signal.

5. The neural interface system of claim 1, wherein the feature extraction circuitry is configured to identify the one or more features of an electromyography (EMG) signal.

6. The neural interface system of claim 1, wherein the neural processing circuitry further comprises:
a long short-term memory (LSTM) neural processing layer to identify patterns in sequences of the one or more input signals;
a convolution neural network layer in which input signals and feedback data are assigned to one or more nodes of the convolution neural network layer and selected features are assigned weighting factors; and
a fully connected layer comprising a single-layer neural network architecture.

7. The neural interface system of claim 1, further comprising channel mask layer circuitry to exclude selected input signals.

8. The neural interface system of claim 1, further comprising transformation circuitry to transform the one or more input signals from a first type of signal to a second type of signal.

9. A non-transitory storage device that includes machine-readable instructions that, when executed by one or more processors, cause one or more processors to perform operations comprising:
identify a current context of a plurality of contexts based on a first trigger event;
decode one or more features of one or more input signals to determine a first task of a plurality of tasks in the current context;
responsive to detecting a second trigger event, change the current context to a next context of the plurality of contexts; and
build a neural network decoder directly from raw data, wherein the neural network decoder further comprises:
learn the one or more features of a deep neural network directly from the raw data; and
adjust the one or more features and the neural network decoder based on a predicted output during normal use, wherein adjusting the features and the neural network decoder during normal use does not require recalibration by a user.

10. The non-transitory storage device of claim 9, wherein the first trigger event and the second trigger event each includes at least one of the one or more features of a second input signal, a location, a button press, a manual signal, a brainwave electrical signal, training data, and/or a training routine associated with a context.

11. The non-transitory storage device of claim 9, wherein the machine-readable instructions that, when executed by the one or more processors, cause the one or more processors to perform the operations, further comprises:
update one or more model parameters of a neural network decoding model for any context of the of the plurality of contexts using new data and predicted output during usage of the current context, wherein the one or more model parameters of a neural network decoding model are updated for all previously collected contexts.

12. The non-transitory storage device of claim 9, wherein the machine-readable instructions that, when executed by the one or more processors, cause the one or more processors to perform the operations, comprising:

identify the one or more features of an electromyography (EMG) signal.

13. The non-transitory storage device of claim 9, wherein the machine-readable instructions that, when executed by the one or more processors, cause the one or more processors to perform the operations, comprising:

exclude selected input signals.

14. A method for selecting neural network architectures, the method comprising:

determine a directed acyclic graph (DAG) representing all potential architecture choices to search;

determining a first loss function applied to a set of training data using the DAG;

determining a second loss function applied to one or more sets of validation data using the DAG;

optimizing a plurality of neural network parameters based on the first loss function applied to the set of training data;

optimizing one or more architecture graph connections based on the second loss function applied to the one or more sets of validation data; and determining a robust architecture based on a result of optimizing the one or more architecture graph connections based on the second loss function applied to the one or more sets of validation data.

15. The method of claim 14, wherein optimizing the plurality of neural network parameters based on the first loss function applied to the set of training data further comprises:

descending a gradient of the plurality of neural network parameters; and updating a weight based on the gradient for each neural network parameter of the plurality of neural network parameters.

16. The method of claim 14, wherein optimizing the one or more architecture graph connections based on the second loss function applied to the one or more sets of validation data further comprises:

descending a gradient of the one or more architecture graph connections; and updating a weight based on the gradient for each of the one or more architecture graph connections.

* * * * *